United States Patent [19]

Johnson, Sr.

[11] Patent Number: 5,414,950
[45] Date of Patent: May 16, 1995

[54] PORTABLE, ADJUSTABLE BLIND

[76] Inventor: Billy J. Johnson, Sr., 3238 Lakewood Dr., Shreveport, La. 71109

[21] Appl. No.: 82,743

[22] Filed: Jun. 23, 1993

[51] Int. Cl.⁶ ............................................. A01M 31/06
[52] U.S. Cl. .......................................... 43/1; 135/119; 135/901; 135/143; 160/135; 160/372
[58] Field of Search ............... 135/900, 901, 902, 115, 135/114, 106, 107, 108, 117, 119, 105; 160/135, 372, 373, 377; 43/1

[56] References Cited

U.S. PATENT DOCUMENTS

| | | | |
|---|---|---|---|
| 1,238,646 | 8/1917 | Dennis | 160/135 X |
| 2,196,544 | 4/1940 | Bagley | 135/902 X |
| 2,612,900 | 10/1952 | Treppa | 135/902 X |
| 3,622,201 | 3/1970 | Rodig | 297/217 |
| 3,874,398 | 4/1975 | Hendrickson | 135/4 R |
| 3,913,598 | 10/1975 | Glutting, Jr. et al. | 135/901 X |
| 4,085,789 | 4/1978 | Steiner et al. | 160/135 |
| 4,751,936 | 6/1988 | Zibble | 135/117 |
| 4,761,908 | 8/1988 | Hayes | 43/1 |
| 4,768,317 | 9/1988 | Markham | 135/117 X |
| 4,773,437 | 9/1988 | Glutting | 135/901 X |
| 4,777,755 | 10/1988 | Colburn | 43/1 |
| 4,794,717 | 1/1989 | Horsmann | 43/1 |
| 4,798,019 | 1/1989 | Svry et al. | 43/1 |
| 4,926,892 | 5/1990 | Osmonson et al. | 135/900 X |
| 4,926,893 | 5/1990 | Klopfenstein et al. | 135/901 X |
| 5,062,234 | 11/1991 | Green | 43/1 |

FOREIGN PATENT DOCUMENTS 0234126  11/1959  Australia ........................ 135/902

*Primary Examiner*—Lanna Mai
*Attorney, Agent, or Firm*—John M. Harrison

[57] ABSTRACT

A portable, adjustable blind for hunters, which blind includes at least one panel characterized by a fixed frame and an adjustable frame telescoping into the fixed frame with camouflaged panels attached to the fixed frame and the adjustable frame for adjusting the height of the blind in the field. In a preferred embodiment the camouflaged panels are attached to the fixed frame and the adjustable frame by means of removable clips and multiple panels may be joined in hinged relationship by means of hinge clips to facilitate construction of a blind on substantially any terrain and in any desired configuration.

12 Claims, 2 Drawing Sheets

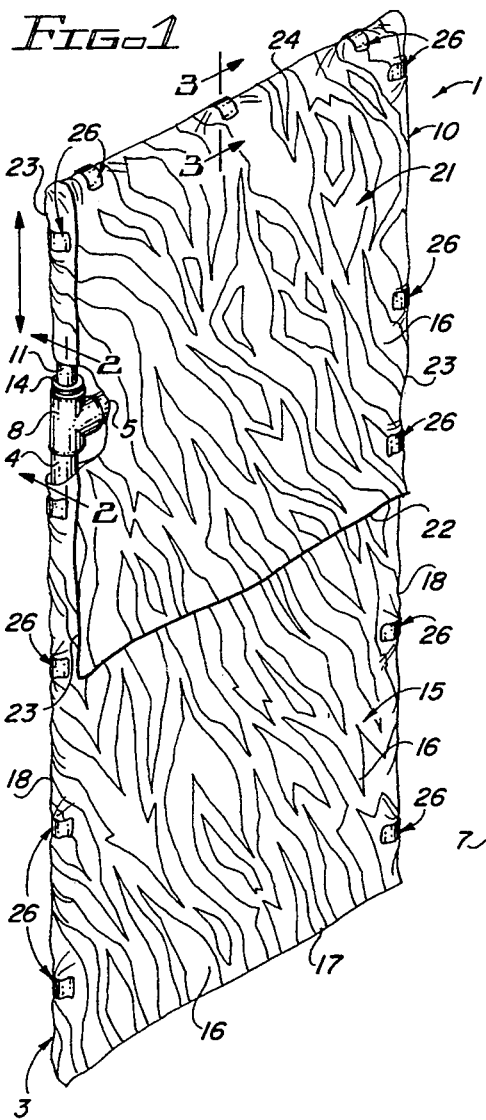
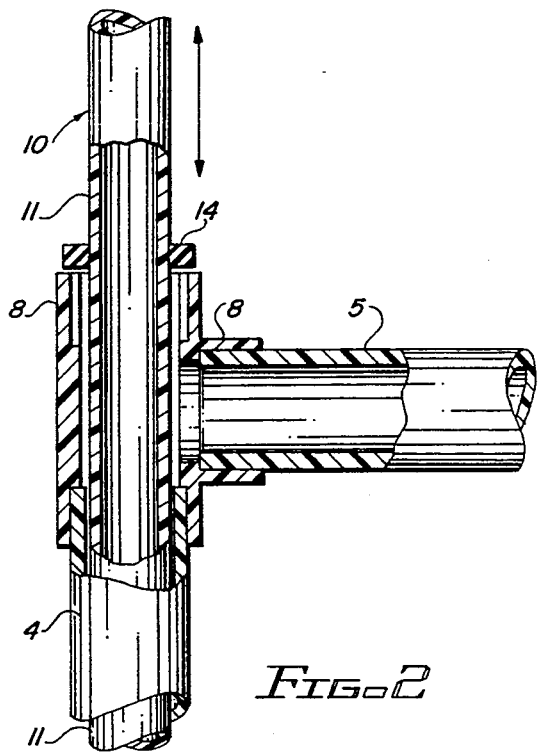
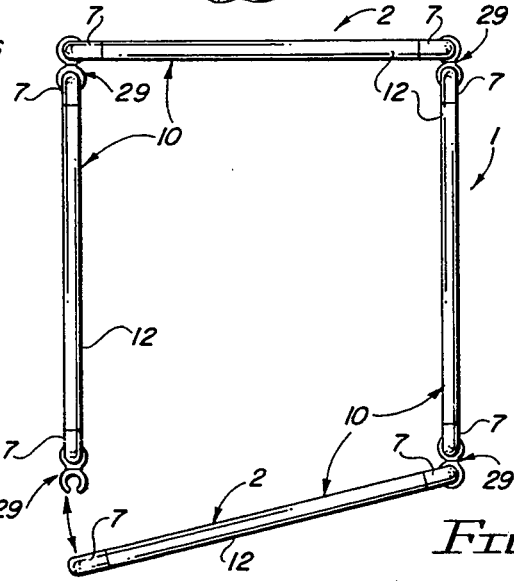
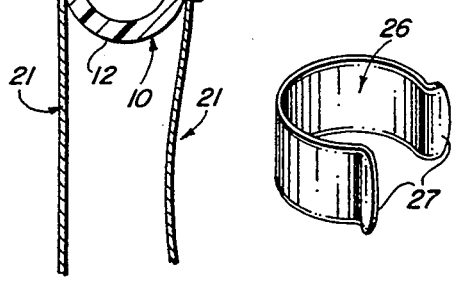
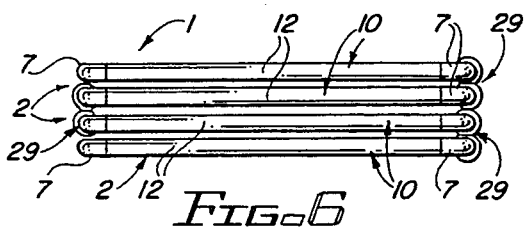

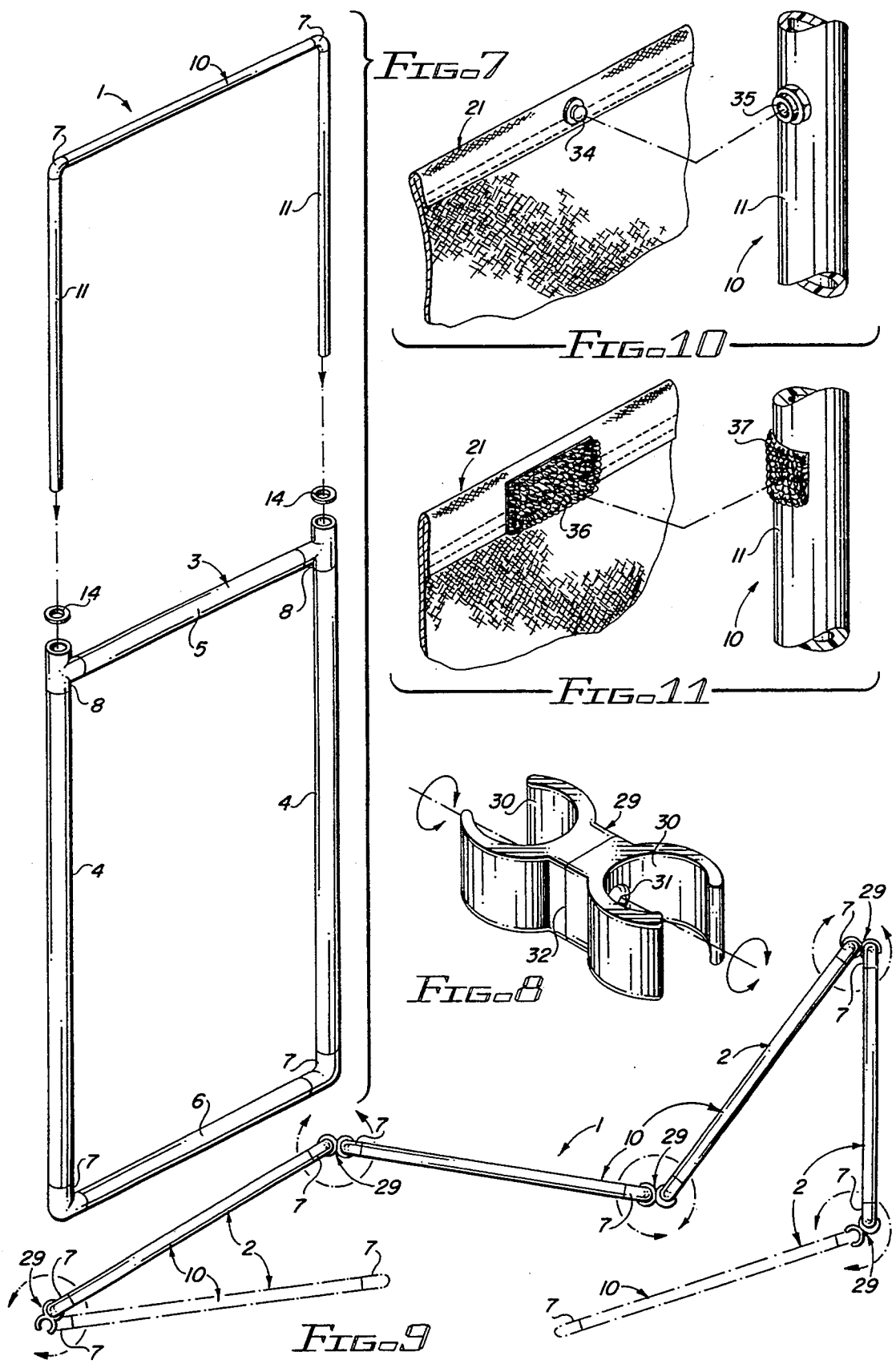

PORTABLE, ADJUSTABLE BLIND

BACKGROUND OF THE INVENTION

1. Field of the Invention

This invention relates to outdoor activities such as hunting, bird watching, wildlife observation and the like and more particularly, to a portable, lightweight, compact and adjustable blind for concealing an observer, such as a hunter, which blind is characterized by a fixed camouflaged frame or panel and a vertically-adjustable camouflaged frame or panel attached to the fixed camouflage panel. In a preferred embodiment the adjustable camouflage panel is telescopically attached to the fixed camouflage panel and is vertically adjustable to adjust the height of the blind. In another preferred embodiment multiple units of the camouflage panels are attached in hinged relationship by means of hinge clips to facilitate mounting the blind on uneven terrain in a selected configuration. In yet another preferred embodiment camouflage material is removably attached to the fixed and adjustable panels by means of panel clips.

One of the problems which is inherent in hunting and wildlife observation and particularly, in hunting and observing such wary game as deer, turkey and the like, is that of adequately concealing the hunter or observer from approaching game or wildlife. Typical concealment stands and blinds include fixed platforms mounted in trees, tripod-supported, portable stands having rotating, saddle-type seats at the top and large, cumbersome fixed stands constructed of plywood or cardboard, which are difficult to construct or transport, deploy and use effectively.

Since wild game typically have very sharp eyesight and hearing and are sensitive to even small movements, the use of camouflage clothing alone is sometimes insufficient to facilitate close approach by such game. Such close approach to the hunter is particularly necessary during bow and arrow hunting, and in the case of wildlife observation and photography, additional cover, whether natural or artificial, is usually necessary to promote close observation of wild animals and birds without alarming the creatures.

2. Description of the Prior Art

Typical of the patented prior art concealment devices known in the art is the Lightweight Portable Ice Fishing Shelter Frame detailed in U.S. Pat. No. 3,874,398, dated Apr. 1, 1975, to Richard E. Hendrickson. The device consists of multiple tubular elements pivotally secured together so as to fold in a compact bundle. When open, the tubes support a rectangular shelter suspended internally of the frame for protecting an occupant during ice fishing. U.S. Pat. No. 3,622,201, dated Nov. 23, 1971, to T. N. Radig, details a "Portable Blind" which includes a screen covered with camouflage material and fitted with a spike at the bottom and a hinge for attaching the screen to the spike, such that the blind can be rotated in any desirable position about the spike during use. U.S. Pat. No. 4,751,936, dated Jun. 21, 1988, to Thomas L. Zibble, et al, details a "Portable Field Blind". The blind includes an elongated frame assembly for concealing a hunter and a pivotal canopy frame with ground-engaging side support flaps. The canopy frame is hingedly connected to one end of a top frame segment of a base frame supported on foldable legs. A spring is connected between the canopy frame and the base frame. The hunter lying under the frame assembly may exert slight upward force on the canopy frame as he sits up, to cause the spring to rapidly pull the canopy frame into an open position over the top frame segment. A "Portable Hunting Blind" is detailed in U.S. Pat. No. 4,761,908, dated Aug. 9, 1988, to A. H. Hayes. The blind includes two or more separate hoops that are connected by collapsible stays. The stays are movable between a collapsed position, in which the hoops are closely adjacent to each other and a substantially rigid extended position, in which the hoops are spaced apart from each other to form a cylindrical framework. The hoops are covered by a flexible canvas or similar material. U.S. Pat. No. 4,777,755, dated Oct. 18, 1988, to James A. Colburn, details a "Portable Hunting Blind and Shelter". The device includes an upper frame having a peripheral frame structure, top reinforcing side members and a cross strut. Gun-support bars are attached to and vertically spaced from the upper frame and a bottom frame structure is separably attached to the upper frame. A cover extends about the upper frame and the lower frame and includes multiple window openings and a flap on the inside and outside of the window openings opens or closes the openings at the option of the hunter. U.S. Pat. No. 4,794,717, dated Jan. 3, 1989, to Edward O. Horsmann, details a "Hunting Blind Structure" adapted for hunting ducks and geese, wherein the blind is arranged to resemble a bale of hay and contains sufficient space to accommodate a hunter. A "Portable Blind" is detailed in U.S. Pat. No. 4,798,019, dated Jan. 17, 1989, to P. A. Sury, et al. The blind is characterized by a box-like structure fitted with a sliding top and provided with handles for carrying purposes and has at least one seat for seating the hunter. Another "Portable Blind" is detailed in U.S. Pat. No. 5,062,234, dated Nov. 5, 1991, to Richard T. Green. The blind includes a length of camouflage material stretched between multiple supports embedded in the ground to define discreet panels and conceal a hunter or observer. The camouflage material can be fitted with a drawstring around the top edge and in a most preferred embodiment, the elongated supports include a bottom member, a receptacle fitted to the top end of the bottom member for receiving the bottom end of a corresponding top member and an elastic band connecting the bottom end of the top member to the top end of the bottom member. Alternatively, the bottom member may be telescoped into the top member to disassemble the blind and extended from the bottom member to deploy the blind.

It is an object of this invention to provide a new and improved portable, adjustable blind or screen for concealing a hunter or observer, which blind is characterized by at least one camouflage panel having a fixed frame contacting the ground and an adjustable frame vertically telescoping with respect to the fixed frame for adjusting the height of the panel and controlling the protection afforded the hunter or observer behind the panel.

Another object of this invention is to provide a portable, adjustable blind for hunters and/or observers, which blind includes a tubular fixed frame for contacting the ground, an adjustable frame telescoping into the fixed frame for vertically adjusting the height of the blind and camouflage fabric attached to the fixed frame and the adjustable frame by means of clips or other fasteners to effect height adjustment of the adjustable frame.

Still another object of this invention is to provide a new and improved portable, adjustable blind which is characterized by at least one concealment panel defined by a fixed frame telescopically fitted with an adjustable frame having o-rings to maintain a selected adjustment of the adjustable frame with respect to the fixed frame, both frames of which are also provided with flexible camouflaged panels or sheets by means of removable clips to hide a hunter or observer in the field.

A still further object of the invention is to provide a portable, adjustable blind for concealing a hunter and/or observer from wildlife, which blind includes multiple, fixed panel frames hingedly connected by means of sliding clips to facilitate orientation of the frames on irregular terrain and in any desired configuration and adjustable panel frames telescopically mounted in the fixed panel frames, respectively, along with separate flexible camouflage cloth panels applied to the fixed panel frames and the adjustable panel frames by means of removable clips, for individually adjusting the height of each of the adjusting frames with respect to the corresponding fixed frames using o-rings mounted on the adjusting frames.

SUMMARY OF THE INVENTION

These and other objects of the invention are provided in a new and improved portable, adjustable blind for concealing an observer or hunter from wildlife, which blind includes at least one fixed tubular panel fitted with a flexible camouflage fabric by means of removable clips and provided with an adjusting frame, also fitted with a length of camouflage material by use of clips, such that the adjusting frame may be telescopically adjusted with respect to the fixed frame by means of o-rings provided on the adjusting frame. In another preferred embodiment multiple units of the panels are joined by means of hinge clips which slide on the fixed frames to facilitate positioning of the blind on uneven terrain in a selected configuration.

BRIEF DESCRIPTION OF THE DRAWINGS

The invention will be better understood by reference to the accompanying drawings, wherein:

FIG. 1 is a perspective view of a preferred embodiment of the portable, adjustable blind of this invention;

FIG. 2 is a sectional view taken along line 2—2 of the portable, adjustable blind illustrated in FIG. 1, illustrating a typical connection between adjustable frame and fixed frame elements of the portable, adjustable blind;

FIG. 3 is a sectional view of a typical removable panel clip for attaching a flexible camouflage cloth or fabric to the respective frame members of the portable, adjustable blind of this invention;

FIG. 4 is a top view of a second preferred embodiment of the portable, adjustable blind, wherein multiple blind panels are connected by removable hinge clips and deployed in functional concealment configuration;

FIG. 5 is a perspective view of a preferred panel clip for securing the camouflage fabric to the respective frame members of the portable adjustable blind;

FIG. 6 is a top view of the portable adjustable blind illustrated in FIG. 4 in folded configuration;

FIG. 7 is an exploded view of most preferred fixed and adjustable frame components of the portable, adjustable blind of this invention;

FIG. 8 is a perspective view of a preferred hinge clip for attaching the frame members of respective portable, adjustable blind panels together in hinged relationship;

FIG. 9 is a top view of multiple units of the portable, adjustable blind connected by means of the hinge clips illustrated in FIG. 8 to construct a blind of selected articulation;

FIG. 10 is a perspective view of an alternative technique for connecting the camouflage fabric to the frame members using snaps; and FIG. 11 is a perspective view of another alternative technique for attaching the camouflage fabric to the frame members using loop-pile fasteners.

DESCRIPTION OF THE PREFERRED EMBODIMENTS

Referring initially to FIGS. 1, 2, 3, 5 and 7 of the drawings, in a preferred embodiment of the invention the portable adjustable blind of this invention is generally illustrated by reference numeral 1. The portable, adjustable blind 1 is characterized by a fixed frame 3, constructed of a pair of parallel, spaced fixed frame legs 4 connected by a fixed frame top member 5 and a fixed frame bottom member 6, as illustrated in FIG. 7. In a preferred embodiment, the fixed frame top member 5 is connected to the top ends of the fixed frame legs 4 by means of tee fittings 8, while the fixed frame bottom member 6 is attached to the bottom ends of the fixed frame legs 4 by means of elbow fittings 7. However, it will be appreciated by those skilled in the art that other fittings may be used to assemble the fixed frame 3 according to the knowledge of those skilled in the art. An adjustable frame 10 is characterized by a pair of adjustable frame legs 11, connected at the top by an adjustable frame bar 12 by means of additional elbow fittings 7. The bottom free ends of the adjustable frame legs 11 slidably telescope into the tee fittings 8 and top ends of the fixed frame legs 4, as illustrated in FIG. 2 and an o-ring 14 is fitted on each one of the adjustable frame legs 11 and seats on the respective tee fitting 8. The o-rings 14 exert friction tension on the adjustable frame legs 11 and facilitate adjustment of the adjustable frame 10 with respect to the fixed frame 3, as illustrated in FIG. 2.

As illustrated in FIGS. 1 and 3, in another preferred embodiment of the invention a fixed camouflage panel 15 is secured to the fixed frame 3 by means of panel clips 26, which clip over the flexible fixed camouflage panel 15 onto the fixed frame legs 4. Similarly, an adjustable camouflage panel 21 is secured to the adjustable frame 10 by means of additional panel clips 26, which are sized to clip to the respective adjustable frame legs 11 over the flexible adjustable camouflage panel 21, to secure the adjustable camouflage panel 21 to the adjustable frame 10. The fixed camouflage panel 15 and adjustable camouflage panel 21 are provided with a camouflage pattern 16 which is suitable for the terrain in which the portable, adjustable blind 1 is to be assembled and used. For example, the camouflage pattern 16 may resemble the popular "Trebark" or "Realtree" camouflage patterns well known to those skilled in the art. The fixed camouflage panel 15 is attached to the fixed frame 3 such that the fixed panel bottom edge 17 substantially aligns with the fixed frame bottom member 6 of the fixed frame 3, while the fixed panel side edges 18 of the fixed camouflage panel 15 are fitted over the respective fixed frame legs 4 by operation of the respective panel clips 26. Similarly, the adjustable camouflage bottom edge 22 of the adjustable camouflage panel 21 is adjusted to overlap the fixed panel top edge (not illustrated) which substantially aligns with, and may be secured to the fixed frame top member 5, to present a continuous camouflage pattern 16 from the top of the adjustable frame 10 to the bottom of the fixed frame 3. Additional panel clips 26 are used to removably attach the adjustable camouflage panel side edges 23 to the respective adjustable frame legs 11 and the fixed frame legs 4 and the adjustable camouflage panel top edge 24 to the adjustable frame bar 12. Sizing of the adjustable camouflage panel 21 is such that extension of the adjustable camouflage bottom edge 22 to a point well below the fixed panel top edge insures that vertical adjustment of the adjustable frame 10 with respect to the fixed frame 3 does not extend the adjustable camouflage panel bottom edge 22 past the fixed panel top edge at the fixed frame top member 5 when the adjustable frame 10 is adjusted upwardly to its maximum travel with respect to the fixed frame 3.

Referring again to FIGS. 1 and 7 of the drawings, it will be appreciated by those skilled in the art that the adjustable frame 10 can be adjusted vertically with respect to the fixed frame 3 by extending the respective adjustable frame legs 11 from the corresponding fixed frame legs 4 or retracting the adjustable frame legs 11 into the corresponding fixed frame legs 4, as desired, in order to adjust the height of the portable, adjustable blind 1. Each such adjustment is automatically maintained by virtue of the friction between the o-rings 14 and the respective adjustable frame legs 11, since the o-rings 14 seat on the respective tee fittings 8, mounted on the corresponding fixed frame legs 4. Accordingly, sliding of the adjustable frame 10 upwardly with respect to the fixed frame 3 and correspondingly forcing the o-rings 14 downwardly along the respective adjustable frame legs 11 to seat on the tee fittings 8, facilitates maintenance of a desired adjustable frame 10 elevation and extension with respect to the fixed frame 3. Telescoping of the respective adjustable frame legs 11 downwardly into the corresponding fixed frame legs 4 automatically seats the o-rings 14 on the tee fittings 8 and insures a selective setting of the adjustable frame 10 with respect to the fixed frame 3. Once the adjustable frame 10 is adjusted with respect to the fixed frame 3 to the desired extent, additional panel clips 26 may be used to secure the adjustable camouflage side edges 23 of the adjustable camouflage panel 21 to the respective fixed frame legs 4 and prevent undesirable flapping, fluttering or rippling of the adjustable camouflage panel 21.

Referring now to FIGS. 4, 6, 8 and 9 of the drawings, in another preferred embodiment of the invention multiple units of the fixed frame 3 and adjustable frame 10 can be attached in side-by-side, articulated and vertically-adjustable relationship by means of the hinge clips 29 illustrated in FIG. 8. In a most preferred embodiment the hinge clips 29 are each characterized by a pair of engaging segments 30, designed to engage the respective fixed frame legs 4 of adjacent portable, adjustable blinds 1 and which are fitted to each other along a pivot line 32 by means of a connecting pin 31. Accordingly, the hinge clips 29 not only rotate or pivot and slide on the respective fixed frame legs 4 to which they are attached by the slip-fit of the engaging segments 30, but also twist or pivot about an axis defined by the connecting pin 31 to facilitate irregular alignment of the respective portable adjustable blinds 1. Furthermore, differences in terrain elevation may be accommodated by sliding the respective fixed frame leg 4 downwardly in a corresponding engagement segment 30 of a hinge clip 29 with respect to the corresponding fixed frame legs 4 of an opposing panel, to deploy the portable, adjustable blinds 1 in any desired articulated configuration, as illustrated in FIGS. 4 and 9. Access to the portable, adjustable blinds 1 is realized by removing one of the fixed frame legs 4 from the corresponding engaging segment 30 of the hinged clip 29 as illustrated in FIG. 4 and then replacing the fixed frame leg 4 in the engaging segment 30 after entering the portable, adjustable blinds 1. Due to the universal rotation of each of the fixed frame legs 4 in the corresponding engaging segments 30 of the respective hinge clips 29, substantially any configuration desired may be achieved in the portable, adjustable blinds 1, as further illustrated in FIG. 9. Furthermore, substantially any number of panels may be joined using the hinged clips 29 to construct a group of portable, adjustable blinds 1 of selected size. Moreover, due to the highly articulating nature of the hinge clips 29, the portable, adjustable blinds 1 so constructed may be folded and stacked accordion-style in a small space, as illustrated in FIG. 6, to create a high degree of portability in transporting the portable, adjustable blind 1 from place to place.

Referring again to FIGS. 3 and 5 of the drawings, it will be appreciated by those skilled in the art that the panel clips 26 may be constructed as illustrated in FIG. 3 in a generally C-shaped configuration or they may include reverse-curved clip ends 27, as illustrated in FIG. 5, to better facilitate removal from the respective fixed frame legs 4, fixed frame top member 5, fixed frame bottom member 6 and adjustable frame legs 11, as well as the adjustable frame bar 12 of the fixed frame 3 and adjustable frame 10, respectively.

In an alternative preferred embodiment of the invention, the respective fixed frame legs 4, fixed frame top member 5, fixed frame bottom member 6, adjustable frame legs 11 and adjustable frame bar 12 may be fitted with spaced female snap members 35, which receive male snap members 34, attached to the fixed camouflage panel 15 and the adjustable camouflage panel 21, respectively, for securing the fixed camouflage panel 15 to the fixed frame 3 and the adjustable camouflage panel 21 to the adjustable frame 10, respectively. In yet another preferred embodiment of the invention the loop element 36 of a loop pile fastener may be attached to the respective frame members and the pile element 37 secured to the fixed camouflage panel 15 and the adjustable camouflage panel 21, respectively, for the same purpose. However, in a most preferred embodiment of the invention the panel clips 26 are used to secure the fixed camouflage panel 15 to the fixed frame 3 and the adjustable camouflage panel 21 to the adjustable frame 10 because of the flexibility in adjusting the positions of the fixed camouflage panel 15 and the adjustable camouflage panel 21 in the field.

It will be appreciated by those skilled in the art that stakes, wire hooks or other supports or anchors may be used to support the portable, adjustable blind 1 in a desired position of concealment, according to the desires of the user and the knowledge of those skilled in the art. However, under circumstances where multiple units or panels of the fixed frame 3 and adjustable frame 10 are utilized, for example, two or three such panels, the resulting portable, adjustable blinds 1 will be freestanding without the necessity of using stakes or other anchoring devices to secure the portable, adjustable blinds 1 in position. Alternatively, single units or panels of the portable, adjustable blind 1 may be propped against a tree, brush or a stump, or stabilized by securing the panel to a tree, brush or stump by means of a rope.

It will be further appreciated that the fixed frame legs 4 and adjustable frame legs 11 of the fixed frame 3 and adjustable frame 10, respectively, may be constructed of round or square tubing or of alternative structural members which interrelate to effect sliding of the adjustable frame legs 11 with respect to the fixed frame legs 4. Furthermore, while the adjustable camouflage panel 21 and fixed camouflage panel 15 may be constructed of any desirable material, in a most preferred embodiment the panels are fabric having a desirable camouflage pattern 16 thereon. Moreover, it has been found that pipe straps can be substituted for the hinge clips 29 to facilitate connection of respective units or panels of the portable, adjustable blind 1 in articulating relationship.

Accordingly, while the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A portable, adjustable blind comprising a fixed frame, an adjustable frame slidably carried by said fixed frame for adjusting said adjustable frame with respect to said fixed frame and a first camouflage panel carried by said fixed frame and a second camouflage panel carried by said adjustable frame for camouflaging said blind.

2. The portable, adjustable blind of claim 1 comprising fastening means engaging said first camouflage panel, said second camouflage panel, said fixed frame and said adjustable frame for securing said first camouflage panel and said second camouflage panel to said fixed frame and said adjustable frame, respectively.

3. The portable, adjustable blind of claim 1 comprising first clip means engaging said first camouflage panel and said fixed frame for removably securing said first camouflage panel to said fixed frame and second clip means engaging said second camouflage panel and said adjustable frame for securing said second camouflage panel to said adjustable frame.

4. The portable, adjustable blind of claim 1 wherein said fixed frame comprises a pair of fixed frame legs disposed in spaced, substantially parallel relationship and a top member and a bottom member connecting said fixed frame legs; and said adjustable frame comprises a pair of adjustable frame legs carried by said fixed frame legs in telescoping relationship and a bar connecting said adjustable frame legs, whereby said adjustable frame is adjustable with respect to said fixed frame responsive to telescoping of said adjustable frame legs in said fixed frame legs.

5. The portable, adjustable blind of claim 4 comprising a pair of o-rings slidably disposed on said adjustable frame legs in friction engagement for adjustably securing said adjustable frame in a selected position with respect to said fixed frame.

6. The portable, adjustable blind of claim 5 comprising fastening means engaging said first camouflage panel and said fixed frame legs and said second camouflage panel and said adjustable frame legs for securing said first camouflage panel to said fixed frame legs and said second camouflage panel to said adjustable frame legs.

7. A portable, adjustable blind for concealing an observer, comprising at least one concealment panel characterized by a fixed frame having a pair of spaced-apart fixed frame legs; an adjustable frame having a pair of adjustable frame legs telescoping into said fixed frame legs, respectively, of said fixed frame; a pair of o-rings slidably disposed on said adjustable frame legs in friction engagement, for adjustably securing said adjustable frame in a selected position with respect to said fixed frame; and a first camouflage panel carried by said fixed frame and a second camouflage panel carried by said adjustable frame for camouflaging said concealment panel.

8. The portable, adjustable blind of claim 7 comprising first clip means engaging said first camouflage panel, said fixed frame legs and said fixed frame for removably securing said first camouflage panel to said fixed frame and second clip means engaging said second camouflage panel, said adjustable frame legs and said adjustable frame for securing said second camouflage panel to said adjustable frame.

9. The portable, adjustable blind of claim 7 wherein said at least one concealment panel comprises a plurality of concealment panels and comprising hinge means carried by said fixed frame legs for hingedly connecting said concealment panels.

10. The portable, adjustable blind of claim 9 wherein said hinge means comprises a plurality of hinge clips, each of said hinge clips characterized by oppositely-disposed engaging segments for pivotally and slidably engaging said fixed frame legs of said concealment panels and pivot means connecting said engaging segments, whereby said engaging segments are pivotally disposed with respect to each other.

11. The portable, adjustable blind of claim 9 wherein said first fastening means comprises a plurality of first clip means engaging said first camouflage panel and said fixed frame in spaced relationship with respect to each other for removably securing said first camouflage panel to said fixed frame and a plurality of second clip means engaging said second camouflage panel panel and said adjustable frame in spaced relationship with respect to each other for securing said second camouflage panel to said adjustable frame.

12. A portable, adjustable blind comprising a generally rectangular fixed frame having a pair of spaced-apart fixed frame legs; a first sheet of camouflage material provided on said fixed frame; first fastening means engaging said first sheet of camouflage material and said fixed frame for removably securing said first camouflage material to said fixed frame; a U-shaped adjustable frame having a pair of adjustable frame legs telescoping into said fixed frame legs in adjustable relationship; an o-ring provided in friction engagement on each of said adjustable frame legs for maintaining a selected position of said adjustable frame with respect to said fixed frame; a second sheet of camouflage material provided on said adjustable frame; and second fastening means engaging said second sheet of camouflage material and said adjustable frame for removably securing said second sheet of camouflage material to said adjustable frame, whereby said adjustable frame is adjustable with respect to said fixed frame to adjust the height of said blind, responsive to telescoping of said adjustable frame legs in said fixed frame legs.

* * * * *